United States Patent Office 3,782,917
Patented Jan. 1, 1974

3,782,917
CYCLOPENTADIENYL(GROUP IV-B METAL)HYDROCARBON-SULFINATES AND -SULFONATES AS AGENTS FOR INCREASING CROP YIELDS
Joseph J. Mrowca, Wilmington, Del., assignor to E. I. du Pont de Nemours and Company, Wilmington, Del.
No Drawing. Continuation-in-part of application Ser. No. 75,694, Sept. 25, 1970, now Patent No. 3,728,365. This application Apr. 16, 1973, Ser. No. 351,624
Int. Cl. A01n 9/00
U.S. Cl. 71—97                                    11 Claims

ABSTRACT OF THE DISCLOSURE

Novel sulfinato and sulfonato derivatives of cyclopentadienyl-titanium and -zirconium compounds are useful to increase crop yields.

CROSS REFERENCE TO RELATED APPLICATION

This application is a continuation-in-part of my prior application Ser. No. 75,694, filed Sept. 25, 1970, now U.S. Pat. No. 3,728,365.

BACKGROUND OF THE INVENTION

Field of the invention

This invention relates to the use of certain novel sulfinato and sulfonato derivatives of cyclopentadienyl-titanium and -zirconium compounds to increase crop yields of plants.

Prior art

The prior art describes the preparation of various transition-metal compounds containing the $-SO_2M-$ moiety, where M is a transition metal. The methods of preparation include (a) reaction of sulfur dioxide with a hydrocarbyltransition-metal compound, (b) reaction of a sodium hydrocarbonsulfinate with a transition-metal halide, and (c) reaction of a hydrocarbonsulfonyl halide or a hydrocarbonsulfonic anhydride with a transition metal compound.

In all of these products, the $SO_2$ group is bonded to the transition-metal through sulfur; the products contain one or the other of the linkages

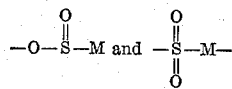

It has also been shown that if certain of these $SO_2$-transition-metal compounds are reacted with bidentate donor ligands, complexes are formed in which the

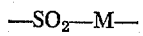

linkages have rearranged to $-S(O)O-M-$, i.e., sulfur bonded through oxygen to M. It is important to note that these compounds are not formed in the reaction in which the $SO_2$ moiety is first introduced, but by secondary reactions of the primary products.

The transition metals that were used in these studies include manganese, rhenium, iron, cobalt, palladium, chromium, molybdenum, and nickel.

References describing the foregoing work are: Wojcickj et al., J. Am. Chem. Soc., 86, 5051 (1964); 88, 844, 4862 (1966); 89, 2493 (1967); 90, 2709 (1968); Inorg. Chem., 7, 1504 (1968); and Inorg. Chim. Acta, 2, 289 (168). Chiswell and Venanzi, J. Chem. Soc. (A), 1966, 1246. Lindner et al., Z. Naturforschg., 22b, 1243 (1967); and J. Organometallic Chem., 13, 431 (1968). Volger and Vrieze, J. Organometallic Chem., 13, 495 (1968). Lindner and Vitzhum, Chem. Ber., 102, 4053, 4062 (1969).

None of these references teach the use of such compounds to influence crop yields.

DESCRIPTION AND DETAILS OF THE INVENTION

It has now been found that if sulfur dioxide is reacted with certain organic derivatives of the transition metals titanium and zirconium, or if a sodium hydrocarbonsulfinate is reacted with an organic titanium or zirconium halide, products containing $SO_2$ moieties bonded to the metal through oxygen are obtained directly.

The compounds of the invention have the formula

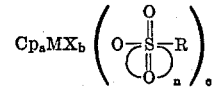

wherein

Cp is cyclopentadienyl, optionally substituted with one to five lower alkyl or phenyl groups (lower alkyl is defined as an alkyl group containing up to 8 carbons);
$a$ is 1 or 2;
M is Ti or Zr;
X is halogen;
$b$ is 0 or 1;
$n=0$ or 1;
R is lower alkyl or phenyl, the phenyl being optionally substituted with up to two lower alkyl, lower alkoxy, di(lower alkyl)amino, trifluoromethyl, or halo groups and containing up to a total of 12 carbons;
$c$ is 1, 2 or 3; and
$a+b+c=4$.

In all these products the cyclopentadienyl or substituted cyclopentadienyl group is pi-bonded to the metal, and the titanium or zirconium is tetravalent, i.e., is in the $+4$ oxidation state.

The presently preferred compounds are the sulfinates, where $n=0$, and they are prepared by two processes. In the first process, a compound of the formula $Cp_aMX_bR_c$, wherein the terms are defined as above, is reacted with sulfur dioxide. Reaction takes place according to the following equation:

In the second process a hydrocarbonsulfinic acid salt, M'SO₂R, wherein M' is an alkali metal, one equivalent of an alkaline-earth metal, or silver is reacted with a compound of the formula $Cp_aMX_{b+c}$. The reaction is represented by the following equation:

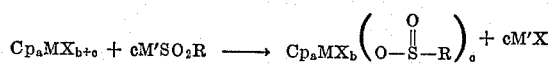

The compounds where $n=1$, the sulfonates, are prepared by reacting approximately stoichiometric quantities of a compound of the formula

$Cp_aMX_{b+c}$ and the silver salt of the corresponding sulfonic acid, $AgOSO_2R$, in boiling tetrahydrofuran. The reaction is usually complete in about five minutes. The desired product can be isolated by filtering the hot mixture to remove silver halide, cooling the filtrate, and diluting it with a nonsolvent such as hexane to precipitate the product.

Examples of Cp groups are methylcyclopentadienyl, ethylcyclopentadienyl, isopropylcyclopentadienyl, t-butylcyclopentadienyl, heptylcyclopentadienyl, pentamethylcyclopentadienyl, phenylcyclopentadienyl, 1,3-diphenylcyclopentadienyl, 1,2,4-triphenylcyclopentadienyl, and tetraphenylcyclopentadienyl. Preferably Cp is cyclopentadienyl or methylcyclopentadienyl, since the corresponding starting materials, cyclopentadiene and methylcyclopentadiene, are commercially available hydrocarbons.

The maximum carbon content of the Cp group will be 45 carbons, and usually no greater than 29. A content no greater than 13 is most common.

Titanium is a preferred value of M because of availability.

X can be any halogen, i.e., F, Cl, Br, or I. Preferably, because of availability, X is Cl or Br, especially Cl.

Examples of R are methyl, ethyl, isopropyl, isobutyl, t-pentyl, s-butyl, isohexyl, octyl, phenyl, tolyl, propylphenyl, dimethylaminophenyl, butoxyphenyl, fluorophenyl, chlorophenyl, bromophenyl, trifluoromethylphenyl, 5-chloro-2-methoxyphenyl, 3,4-dichlorophenyl, 2,4-difluorophenyl, 2-bromo-5-chlorophenyl, 3-diethylamino-p-tolyl, 2,5-xylyl, 2,5-bis(octyloxy)phenyl, and 2-methoxy-5-t-pentylphenyl. The preferred value of R in the products, because of ease in preparation, is hydrocarbyl, particularly lower primary alkyl or phenyl, or phenyl substituted with lower alkyl. Preferably the phenyl group bears at most one substituent.

In the process involving sulfur dioxide, at least a stoichiometric amount of $SO_2$ is used. It is sometimes convenient to use excess sulfur dioxide, since the reaction is thereby promoted and unreacted $SO_2$ is easily removed by evaporation.

Since most of the titanium- and zirconium-containing starting materials are solids, a solvent is normally used in this process. Preferred solvents are aromatic hydrocarbons, such as benzene, alkylbenzenes (e.g., toluene, xylene, and ethylbenzene) and halobenzenes (e.g., fluorobenzene, chlorobenzene, and bromobenzene; preferably chlorobenzene). Also usable as solvents are aliphatic and cycloaliphatic hydrocarbons and halohydrocarbons, particularly chlorohydrocarbons. Examples are hexane, heptane, cyclohexane, methylcyclopentane, chloroform, 1,2-dichloroethane, and 1,2-dibromopropane.

Conveniently and preferably the process is carried out in the temperature range of about 0–25° C. However, it is operable over a wider range, namely, from about −50° C. to 100° C. No particular advantage results from the lower or higher temperatures. The process is usually carried out in an open system. Closed systems, which permit higher pressures, and relatively higher temperatures can be used for relatively unreactive starting materials.

The process normally proceeds readily at ordinary temperatures and is usually essentially complete in less than about two hours—frequently in about 15 minutes. Sixteen hours is the maximum time usually required. The products, which are crystalline solids, can be isolated by evaporation of the solvent or by precipitation with a non-solvent.

In the second process M' will usually be an alkali metal, because of the availability of such salts. Sodium and potassium salts are preferred because of availability, particularly sodium salts.

The ratio of reactants is usually that dictated by the stoichiometry of the reaction. An excess of either reactant can be used, but no particular advantage results.

Any of a variety of solvents can be used. Preferred solvents are aprotic donor liquids. These include ethers such as tetrahydrofuran, 1,2-dimethoxyethane, dioxane, and di(2-ethoxyethyl) ether, alkanenitriles such as acetonitrile and propionitrile, and ketones such as acetone and methyl ethyl ketone. Hydrocarbons and halohydrocarbons can also be used but are less preferred.

The process can be operated over a range of temperature from about 0° C. to the boiling point of the solvent. Normally the process is run somewhere between 0° C. and about 100° C., the preferred temperature range being 20–30° C., i.e., ordinary temperatures.

The time required will depend on the temperature and to some extent on the titanium- or zirconium-containing starting material. Usually no more than 24 hours is required. The process of the reaction can be followed by the precipitation of alkali-metal halide, alkaline-earth metal halide, or silver halide that is formed as a by-product. After removal of this metal halide by filtration, the product of the invention can be isolated by evaporation or precipitation with a non-solvent.

This second process is the preferred one for sulfinates in which c is 3.

EMBODIMENTS OF THE INVENTION

The following examples are illustrative. All parts are by weight and all temperatures are in degrees centigrade, unless otherwise indicated.

EXAMPLE 1

Chlorodicyclopentadienyl(ethanesulfinato)titanium

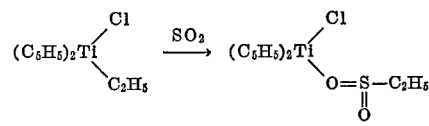

Dry sulfur dioxide was bubbled into a solution of 1.00 g. of chloro(dicyclopentadienyl)ethyltitanium in 50 ml. of dry benzene (prepared under nitrogen) at 5° for 5 min. The solution changed color rapidly from dark red to cherry red. The cooling bath was removed, and the sulfur dioxide was added for an additional 10 min. The solution was then evaporated to ca. 2 ml. under vacuum, and 100 ml. of anhydrous ether was added to give 0.60 g. of chlorodicyclopentadienyl(ethanesulfinato)titanium as an orange-red solid. Cooling the ether filtrate overnight at −78° gave an additional 0.32 g. The pNMR and IR spectra of these solids were identical. An analytical sample (0.30 g., M.P. 88–94°) was prepared by dissolving 0.40 g. of the first solid in 10 ml. of benzene, adding 75 ml. of ether, filtering, and cooling the filtrate in Dry Ice.

Analysis.—Calcd. for $C_{12}H_{15}ClO_2STi$ (percent): C, 47.00; H, 4.93; Cl, 11.56; S, 10.46. Found (percent): C, 47.47; H, 5.13; Cl, 10.95; S, 10.93.

The NMR (nuclear magnetic resonance) absorption spectrum showed a quartet at τ 7.47 for the $CH_2$ protons. The infrared absorption spectrum (KBr disc) included a single band for $SO_2$ vibration at 1088 cm.$^{-1}$. These findings confirm the structure in which sulfur is bonded to titanium through oxygen.

When the sulfur dioxide was added exclusively at ice-bath temperature and the solution was evaporated to dryness without addition of ether, a sample of the same product melting at 98–100° was obtained.

EXAMPLE 2

Chlorodicyclopentadienyl(methanesulfinato)titanium

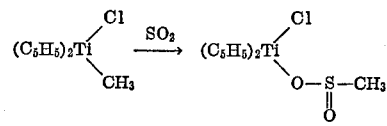

Dry sulfur dioxide was bubbled into a solution of 1.00 g. of chloro(dicyclopentadienyl)methyltitanium in 50 ml. of dry benzene (prepared under nitrogen) for 30 min. After standing for 1.5 hours, the reaction mixture was filtered under nitrogen, and the red filtrate was evaporated with a nitrogen stream. The red, crystalline residue was dried at 0.1 mm. overnight to give 1.24 g. of chlorodicyclopentadienyl(methanesulfinato)titanium, M.P. 120–123° dec.

Analysis.—Calcd. for $C_{11}H_{13}ClO_2STi$ (percent): C, 45.13; H, 4.48; S, 10.97; Cl, 12.13. Found (percent): C, 44.85; H, 4.42; S, 10.70; Cl, 11.96.

The NMR absorption spectrum included a singlet at τ 7.75 for the $CH_3$ protons, and the infrared absorption spectrum included a single band at 1090 cm.$^{-1}$ corresponding to $SO_2$ vibration; both these absorptions confirm the

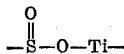

structure.

Treatment of the starting materials in the first column of the following table with sulfur dioxide by essentially the procedure of Examples 1 and 2 will give the products listed in the second column.

Starting material:
    Chlorodicyclopentadienyl(propyl)zirconium
    Butylfluorobis(methyl)titanium
    ylcyclopentadien- Product
    Chlorodicyclopentadienyl propanesulfinato)zirconium.
    Butanesulfinatofluorobis methylcyclopentadienyl) titanium.

EXAMPLE 3

Bis(benzenesulfinato)dicyclopentadienyltitanium

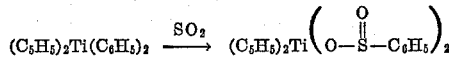

Dry sulfur dioxide was bubbled into a solution of dicyclopentadienyldiphenyltitanium in dry benzene for 3 hours. The flask was stoppered and stored overnight with stirring. The mixture was filtered, and the filtrate was concentrated under aspirator vacuum. The addition of anhydrous ether precipitated a red oil which solidified on standing to a red solid, bis(benzenesulfinato)dicyclopentadienyltitanium, M.P. 96–115° C.

Analysis.—Calcd. for $C_{22}H_{20}O_4S_2Ti$ (percent): C, 57.37; H, 4.39; S, 13.94. Found (percent): C, 57.28; H, 4.67; S, 13.58.

The infrared absorption spectrum (mineral-oil mull) included a single $SO_2$-vibration absorption at 1090–1100 cm.$^{-1}$, which confirmed the sulfur-oxygen-titanium bonding.

Reaction of sulfur dioxide with the starting materials in the first column of the following table, by essentially the procedure of Example 3, gives the products in the second column.

Starting material:
    Dicyclopentadienyl-di-m-tolyltitanium.
    Dicyclopentadienyldiphenylzirconium
    Dimethylbis(phenylcyclopentadienyl)titanium Product
    Dicyclopentadienylbis(m-toluenesulfinato)titanium.
    Dicyclopentadienylbis(benzene-sulfinato)zirconium.
    Bis(methanesulfinato)bis(phenylcyclopentadienyl) titanium.

EXAMPLE 4

Bis(benzenesulfinato)dicyclopentadienyltitanium

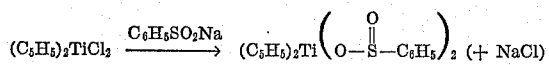

A mixture of 1.00 g. of dichloro(dicyclopentadienyl)titanium, 2.00 g. of sodium benzenesulfinate, and 50 ml. of tetrahydrofuran was stirred under nitrogen for 24 hours. The mixture was filtered, and the filtrate was evaporated under vacuum. The red, viscous residue was treated with 100 ml. of benzene and filtered. The filtrate was evaporated under vacuum to a low volume, and anhydrous ether was added to the residue. The resulting red oil solidified on standing to give bis(benzenesulfinato)dicyclopentadienyltitanium, the product of Example 3.

Reaction of the starting materials in the first column of the following table with the salts in the second column, by essentially the procedure of Example 4, will give the products in the third column.

| Starting material | Coreactant | Product |
|---|---|---|
| Tribromo(cyclopentadienyl)titanium. | Sodium methanesulfinate. | Cyclopentadienyltris-(methanesulfinato)titanium. |
| Dichlorobis(methylcyclopentadienyl)titanium. | Potassium benzenesulfinate. | Bis(benzenesulfinato)bis(methylcyclopentadienyl)titanium. |
| Dibromo(dicyclopentadienyl)zirconium. | Sodium p-toluene sulfinate. | Dicyclopentadienylbis(p-toluenesulfinate (zirconium). |

Additional examples of products of the invention are:

Bis(p-diethylaminobenzenesulfinato)bis(ethylcyclopentadienyl)titanium
Dicyclopentadienylbis(p-methoxybenzenesulfinato)-zirconium
Bis(m-chlorobenzenesulfinato)dicyclopentadienyltitanium
Bis(phenylcyclopentadienyl)bis(m-trifluoromethyl-benzenesulfinato)zirconium
Tris(benzenesulfinato)cyclapentadienyltitanium
Tris(propanesulfinato)cyclopentadienylzirconium.

The preparation of the sulfonates of the invention is exemplified in the following example.

EXAMPLE 5

Dicyclopentadienylbis(methanesulfonato)titanium

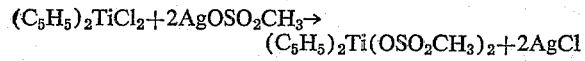

A stirred mixture of 3.00 g. of dichloro(dicyclopentadienyl)titanium, 5.25 g. of silver methanesulfonate, and 225 ml. of tetrahydrofuran was heated slowly to boiling and was gently boiled for 5 min. The hot mixture was filtered, and hexane was added to the filtrate. The resulting orange-red crystals were filtered, washed with hexane, and dried at 25° and 0.1 mm. to give 2.65 g. of dicyclopentadienylbis(methanesulfonato)titanium, dec. beginning at 170°.

Analysis.—Calcd. for $C_{12}H_{15}O_6S_2Ti$ (percent): C, 39.14; H, 4.38; Ti, 13.01; S, 17.41. Found (percent): C, 39.52, 39.49; H, 4.56, 4.51; Ti, 13.72; S, 17.26.

NMR (CDCl$_3$, TMSI int.): δ 2.98 s (6H) C$\underline{H}_3$, o 6.84 s (10H) cyclopentadienly-$\underline{H}$.

By analogous methods using the appropriate reactants additional sulfonates can be made as listed:

Dicyclopentadienylbis(p-toluenesulfonato)titanium
Dicyclopentadienylbis(benzenesulfonato)titanium
Dicyclopentadienylbis(p-toluenesulfonato)zirconium
Cyclopentadienyltris(p-toluenesulfonato)titanium
Bis(m-chlorobenzenesulfonato)dicyclopentadienyl-titanium
Bis(ethanesulfonato)bis(phenylcyclopentadienyl) titanium
Cyclopentadienyltris(methanesulfonato)-zirconium
Bis(benzenesulfonato)bis(methylcyclopentadienyl) titanium
Bis(4-chloro-m-toluenesulfonato)dicyclopentadienyl-titanium
Bis(2-bromo-4-methoxybenzenesulfonato)dicyclopentadienylzirconium
Bis(methylcyclopentadienyl)bis(2,5-xylenesulfinato) titanium.

To increase the yield of most seed crops the compounds are applied to the soil, foliage or reproductive organs of flowering plants. The application can be made at one time or at various times.

A useful application is 0.2–5 lb. per acre with a preferred rate being 0.5–2 lb. per acre.

For convenience in application, the compounds are dissolved in non-phytotoxic solvents or dispersed in liquids so they can be applied as aqueous sprays.

Compositions can be formulated by mixing one or more of the compounds with one or more additives such as surface active agents, finely divided solid diluents and liquid diluents as set out, for example, in U.S. Pat. 3,556,766.

The compositions can be applied as dusts, solutions, emulsions or propellent compositions.

The surface active agents used can be wetting, dispersing or emulsifying agents. They may act as wetting agents for wettable powders and dusts, as dispersing agents for wettable powders and suspensions and as emulsifying agents for emulsifiable concentrates. Surfactants may enhance the biological activity of the compounds of this invention. Such surface active agents can include anionic, cationic and nonionic agents as have heretofore been generally employed in plant control compositions. Suitable surface active agents are set out, for example, in "Detergents and Emulsifiers Annual—1968" by John W. McCutcheon, Inc. Other surface active agents not listed by McCutcheon and effective dispersants through their colloid action include methyl cellulose, polyvinyl alcohol, hydroxyethylcellulose, and alkyl substituted polyvinyl pyrrolidones.

Suitable surface active agents for use in compositions include polyethylene glycol esters with fatty and rosin acids, polyethylene glycol ethers with alkyl phenols, with long-chain aliphatic alcohols, or with sorbitan fatty acid esters. Other suitable surfactants include amine, alkali and alkaline earth salts of alkylaryl or lignin sulfonic acids; amine, alkali and alkaline earth fatty alcholo sulfates, fatty acid esters, etc. Anionic and nonionic surface active agents are preferred.

Compositions containing the compounds can have in addition to surface active agents, solid or liquid diluents to product wettable powders, dusts or emulsifiable liquids as desired.

Emulsifiable liquids are formulated by combining the compounds of this invention with a suitable emulsifier and an organic liquid which may have low water solubility. The active component may be completely dissolved in the organic liquid or it may be a finely ground suspension in a nonsolvent liquid. Suitable organic liquids include hydrocarbons such as xylene; ketones, such as the isophorones, dinutyl or diamyl keto; and esters such as amyl acetate. Preferred emulsifiers are blends of oil soluble sulfonates and nonionic polyoxyethylene glycol esters or ethers of fatty acids or alkylated phenols.

The active component in emulsifiable concentrates is generally present at from 10 weight percent to about 40 weight percent. Combined emulsifiers will be present at from 3 weight percent to about 10 weight percent and the balance will be an organic carrier liquid or solvent.

While conventional applications of sprayable formulations are usually made in a dilute form (for example at a rate of about 200 liters per hectare or more), the compounds of this invention can also be applied at higher concentrations in "low-volume" applications from aircraft or ground sprayers. For this purpose wettable powders can be dispersed in small amounts of aqueous or nonaqueous carrier. The suspension for emulsifiable concentrates can be used directly or with dilution in one or more carriers such as dialkylformamides, N-alkylpyrrolidones, dimethyl sulfoxide, water, hydrocarbons, esters, ketones, glycols, glycol ethers are the like.

The following examples illustrate improvement of yields of wheat, peas and soybeans.

EXAMPLE A

Selkirk variety spring wheat was grown in controlled environment rooms in "Terralite" (washed agricultural vermiculite) under continuous 2500 fc. light at 70° F. and watered with nutrient solution. The "Terralite" was contained in cans; each can contained two wheat plants. Contents of each can were watered daily. In addition, the contents of each can were treated on a particular day or days with 60 ml. of a water suspension of bis(benzenesulfinato)dicyclopentadienyltitanium in a concentration corresponding to an application rate of 2.5 lbs. per acre. This treatment was made 8 hours after regular watering.

After 30 days the seed heads were just emerging; after 65 days the plants had started to senesce visibily. All plants were harvested 90 days after planting. The following table shows the number of mature seed heads and the weights of the same seed heads, expressed as percentages of values obtained in a control experiment in which no titanium compound was used. The results show that bis(benzenesulfinato)dicyclopentadienyltitanium increased both the number and the weight of mature seed heads in these wheat plants.

| Day or days treated with Ti compound [1] | Number of seed heads | Weight of seed heads |
|---|---|---|
| 30, 37, 44, 51, 58, 65 | 114 | 132 |
| 30 | 132 | 163 |
| 37 | 124 | 130 |
| 44 | 109 | 117 |
| 51 | 103 | 107 |
| 58 | 105 | 108 |
| 65 | 108 | 121 |

[1] Day of planting=0.

EXAMPLE B

Progress No. 9 dwarf peas were grown in controlled environment room in "Terralite" under 18 hours 2200 fc. light at 72° F. and 6 hours dark at 65° F. per day and watered with nutrient solution. The plants were treated 13 days after planting with a water suspension of bis(benzenesulfinato)dicyclopentadienyltitanium as in Example A, except at a rate corresponding to 0.5 lb. per acre; treatment was at the roots. The plants were harvested 34 days later. The following were recorded, again as percentages of the corresponding values for untreated controls: height, 103; number of mature pods, 145, number of mature peas, 116; weight per pea, 102.

EXAMPLE C

Selkirk variety spring wheat was grown in a controlled-environment room in a 1/1 mixture of pea-sized gravel and "Jiffy Mix" (a commercial growth mixture consisting of 1/1 vermiculite/peat moss, plus nutrients) under the following conditions: Photoperiod 18 hours (out of every 24 hours) with 1900 fc. light at 75° F.; night temperature 65° F.; continuous relative humidity 71%. The growth mixture was contained in plastic pots six inches in diameter. The experiment involved four such pots (replications), each pot containing two plants, with watering as necessary. In the vegetative stage, 19 days after planting, a suspension of dicyclopentadienylbis(p-toluenesulfonato)titanium in acetone/glycerol/water/"Tween" 20 commercial dispersing agent (91.8/4/4/0.2) was applied as a foliar spray and a soil drench at a dosage corresponding to a rate of 1.0 pound of titanium compound per acre. The plants were harvested 79 days after planting, and the dry weights of green and mature seedheads were measured. In a control experiment, eight other plants were grown and harvested as described above, but were not treated with the titanium compound.

The average total weight of green and mature seeds per pot was 36.2 g. for plants treated with the titanium compound and 34.3 g. for untreated plants showing that dicyclopentadienylbis(p-toluenesulfonato)titanium brought about an increase in the yield of the wheat.

EXAMPLE D

By essentially the method of Example C, dicyclopentadienylbis(p-toluenesulfinato)titanium and bis(benzenesulfonato)dicyclopentadienyltitanium were tested as yield increasers for wheat. Temperature of 70–72°° F. and relative humidity of 74% were maintained throughout. The titanium compounds were applied 18 days after planting, and the plants were harvested 104 days after planting. The average total weights of green and mature seeds per pot were as follows:

Plants treated with $(C_5H_5)_2Ti(OSOC_6H_4\text{-}p)_2$, 55.7 g..
Plants treated with $(C_5H_5)_2Ti(OSO_2C_6H_5)$, 49.2 g.
Untreated plants, 48.2 g.

EXAMPLE E

Bis(benzenesulfinato)dicyclopentadienyltitanium was applied as a spray at various rates to the soil of field-grown soybeans, variety Kent, 64 days after planting. Each treatment was replicated four times. The average crop yield of soybeans was calculated for each rate on the basis of 13% moisture. The results were as follows.

| Rate (lb./acre): | Crop yield (percent of untreated control) |
|---|---|
| 0 (control) | 100 |
| 0.25 | 105 |
| 1.00 | 110 |
| 4.00 | 123 |

EXAMPLE F

Bis(benzenesulfinato)dicyclopentadienyltitanium was applied as a spray at various rates to the soil of field-grown winter wheat at about the boot stage of development (about one month before maturation). Each treatment was replicated four times, and the average yield of grain for each rate was calculated. The results were as follows.

| Rate (lb./acre): | Crop yield (percent of untreated conttrol) |
|---|---|
| 0 (control) | 100 |
| 0.50 | 122 |
| 2.00 | 110 |
| 5.00 | 114 |

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of increasing the yield of crop plants by applying to the growing plants an effective amount of a compound of the formula

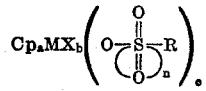

wherein
Cp is cyclopentadienyl, optionally substituted with one to five lower alkyl or phenyl groups;
$a$ is 1 or 2;
M is Ti or Zr;
X is halogen;
$b$ is 0 or 1;
$n=0$ or 1;
R is lower alkyl or phenyl, the phenyl being optionally substituted with up to two lower alkyl, lower alkoxy, di(lower alkyl)amino, trifluoromethyl, or halo groups and containing up to a total of 12 carbons;
$c$ is 1, 2 or 3; and
$a+b+c=4$.

2. The process of claim 1 wherein the compound is applied at the rate of 0.2 to 5 lbs./acre.

3. The process of claim 1 wherein the crop plant is selected from the group consisting of wheat, pea and soybean.

4. The process of claim 1 wherein $n=0$.

5. The process of claim 1 wherein $n=1$.

6. The process of claim 4 in which M is titanium and R is phenyl or phenyl substituted with a lower alkyl.

7. The process of claim 5 in which M is titanium and R is phenyl or phenyl substituted with a lower alkyl.

8. The process of claim 1 in which the compound used is bis(benzenesulfinato)dicyclopentadienyltitanium.

9. The process of claim 1 in which the compound used is bis(p-toluenesulfinato)dicyclopentadienyltitanium.

10. The process of claim 1 in which the compound used is dicyclopentadienylbis(p - toluenesulfonato)titanium.

11. The process of claim 1 in which the compound used is bis(benzenesulfonato)dicyclopentadienyltitanium.

References Cited
UNITED STATES PATENTS
| | | | |
|---|---|---|---|
| 3,264,177 | 8/1966 | Kenaga | 71—97 X |
| 3,097,225 | 7/1963 | Dubeck | 71—97 X |

FOREIGN PATENTS
| | | | |
|---|---|---|---|
| 16,391 | 7/1969 | Japan | 71—97 |

CHARLES N. HART, Primary Examiner

R. BARNES, Assistant Examiner

U.S. Cl. X.R.

71—27

PO-1050
(5/69)

UNITED STATES PATENT OFFICE
CERTIFICATE OF CORRECTION

Patent No. 3,782,917      Dated January 1, 1974

Inventor(s) Joseph J. Mrowca

It is certified that error appears in the above-identified patent and that said Letters Patent are hereby corrected as shown below:

Col. 1 line 61 "Wojcickj" should be -- Wojcicki --.

Col. 4 line 32 "pNMR" should be -- PNMR -- or -- pnmr --.

Col. 5 line 16 "yl)titanium" should be -- ylcyclopentadien- --.

Col. 5 line 17 "ylcyclopentadien-" should be -- yl)titanium --.

Col. 6 line 19 "cycla" should be -- cyclo --.

Col. 7 line 59 "are" should be -- and --.

Signed and sealed this 3rd day of December 1974.

(SEAL)
Attest:

McCOY M. GIBSON JR.
Attesting Officer

C. MARSHALL DANN
Commissioner of Patents